United States Patent
Keller

(10) Patent No.: US 6,967,233 B2
(45) Date of Patent: Nov. 22, 2005

(54) SYNTHESIS OF ELASTOMERIC POLY(CARBORANE-SILOXANE-ACETYLENE)S

(75) Inventor: Teddy M. Keller, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 63 days.

(21) Appl. No.: 10/456,216

(22) Filed: Jun. 6, 2003

(65) Prior Publication Data

US 2005/0148750 A1 Jul. 7, 2005

Related U.S. Application Data

(60) Provisional application No. 60/450,325, filed on Feb. 28, 2003.

(51) Int. Cl.$^7$ .......................................... C08G 77/56
(52) U.S. Cl. ........................ 528/5; 528/30; 528/32; 528/25
(58) Field of Search .................. 528/5, 30, 32, 528/25; 58/5

(56) References Cited

U.S. PATENT DOCUMENTS

| | | | |
|---|---|---|---|
| 4,145,504 A | * | 3/1979 | Hedaya et al. ............... 528/5 |
| 5,780,569 A | * | 7/1998 | Keller et al. ................. 528/5 |

* cited by examiner

Primary Examiner—Kuo-Liang Peng
(74) Attorney, Agent, or Firm—John J. Karasek; Joseph T. Grunkemeyer

(57) ABSTRACT

A linear polymer comprising carborane, siloxane, and acetylene units, which may be cross-linked to a cured polymer and/or pyrolyzed to a ceramic.

13 Claims, 2 Drawing Sheets

SYNTHESIS OF ELASTOMERIC POLY(CARBORANE-SILOXANE-ACETYLENE)S

This application claims priority to U.S. Provisional Patent Application No. 60/450,325 filed on Feb. 28, 2003.

BACKGROUND

1. Field of the Invention

The invention relates generally to cross-linkable linear polymers containing carborane, siloxane, and acetylene groups, precursors thereof, and elastomers, plastics, and ceramics made therefrom.

2. Description of the Prior Art

The quest for high-temperature elastomers has been an evolving endeavor. An ever-increasing demand for such materials, especially in the aerospace industry, has served as a catalyst for continuing research efforts. The desired properties of such elastomers include long-term thermal, thermo-oxidative, and hydrolytic stabilities to temperatures approaching 400° C., and flexibility to temperatures as low as −50° C. Poly(siloxane)s are known to exhibit good high temperature resistance and excellent elasticity at low temperatures. Their elasticity is attributed to the pronounced conformational flexibility of their —Si—O—Si— backbone chain and to the ease of rotation around their Si—O bonds.

The thermal and oxidative properties of poly(siloxane) systems have been further improved by the incorporation of carboranes in such systems. The high chemical, thermal, and oxidative stabilities of carboranes can make the resultant poly(carborane-siloxane) systems even more resilient at high temperatures. The carboranes impart good protection against oxidative degradation. Furthermore, it has been seen that the incorporation of acetylenes into the backbones of poly(carborane-siloxane) systems improves the ability of these systems to retain their mass at very high temperatures. This is due to the acetylene-imparted ability to generate cross-linked centers, thereby reducing the preferences for skeletal cleavage of the backbone.

Polymers, ceramics, and precursors containing carborane, siloxane, and acetylene groups are disclosed in U.S. Pat. Nos. 5,272,237; 5,292,779; 5,348,927; 5,483,017; 5,756,629; 5,780,569; 5,932,335; 5,969,072; 5,981,678; 6,187,703; 6,225,247; and 6,265,336, all incorporated herein by reference.

U.S. Pat. No. 5,348,917 to Keller et al. discloses a carborane-siloxane-acetylene polymer having the formula:

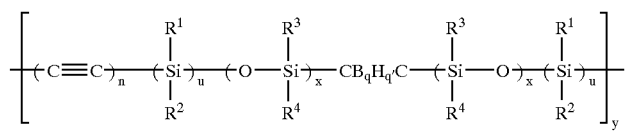

This polymer is made by reacting 1,4-dilithio-1,3-butadiyne with a bis(chlorosiloxy)carborane. The polymer can be cross-linked between acetylene groups to a thermoset and pyrolyzed to a ceramic.

U.S. Pat. No. 5,780,569 to Keller et al. discloses a copolymer containing the above repeating unit and repeating units containing siloxyl and acetylene groups, as in the formula:

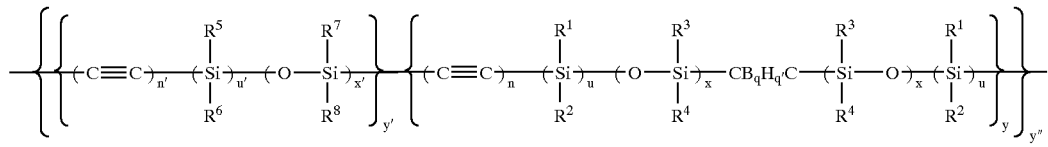

This polymer is made by reacting 1,4-dilithio-1,3-butadiyne with a bis(chlorosiloxy)carborane and a dichlorosiloxane. U.S. Pat. No. 5,483,017 to Keller et al. discloses that the polymer can be cross-linked between acetylene groups to a thermoset and pyrolyzed to a ceramic.

These polymers can have favorable thermal and oxidative properties. The acetylene groups aid in maintaining the polymer's shape and mass at very high temperatures. However, these polymers have a relatively high number of acetylene groups versus siloxane and carborane groups. This results in a high degree of cross-linking that inhibits the natural flexibility of the Si—O bonds. These cross-linked polymers are generally thermosets.

There is need for an elastomer having favorable thermal and oxidative properties. Such an elastomer may be useful in a variety of high temperature applications as insulation for electrical wire and as engine components. Polyimides are currently used as high temperature insulation; however, they readily decompose at 400° C. in air.

SUMMARY OF THE INVENTION

The invention comprises a linear polymer comprising the formula:

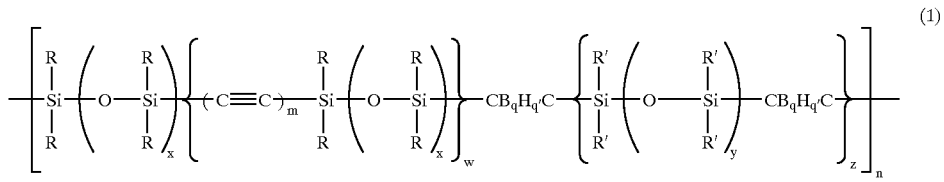
(1)

wherein m, n, w, and z are independently selected integers greater than or equal to 1; x and y are independently selected integers greater than or equal to 0; q is an integer from 3 to 16; q' is an integer from 0 to 16; each R and R' group is an independently selected organic group; (C≡C)$_m$ represents an alkynylene group when m is 1 or conjugated alkynylene groups when m is greater than 1; and CB$_q$H$_{q'}$C is a carborane group.

The invention further comprises an cured polymer comprising the formula:

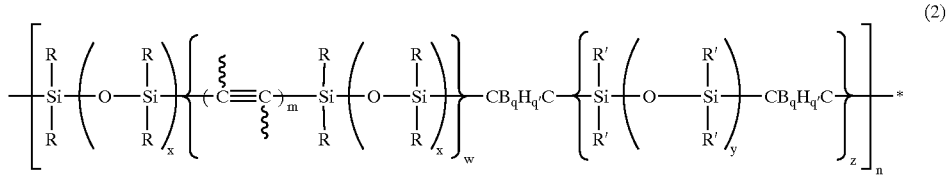
(2)

wherein m, n, w, x, y, z, q, q', R, R', and CB$_q$H$_{q'}$C are as defined above; and

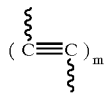

represents a group made from an alkynylene group when m is 1 or conjugated alkynylene groups when m is greater than 1, crosslinked to another such group.

The invention further comprises a siloxane-acetylene precursor comprising the formula:

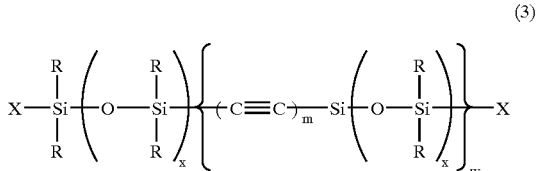
(3)

wherein m, w, x, R, and (C≡C)$_m$ are as defined above; and X is a halogen.

The invention further comprises a carborane-siloxane precursor comprising the formula:

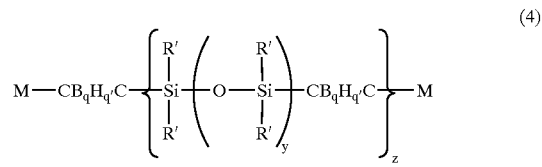
(4)

wherein y, z, q, q', R', and CB$_q$H$_{q'}$C are as defined above, and wherein M is selected from the group consisting of Li, Na, K, and MgX', wherein X' is a halogen.

The invention further comprises a synthesis process comprising the steps of: providing a siloxane-acetylene precursor as defined above and a carborane-siloxane precursor as defined above; and reacting the siloxane-acetylene precursor with the carborane-siloxane precursor to form a linear polymer.

DETAILED DESCRIPTION OF EXAMPLE EMBODIMENTS

Figure 1:
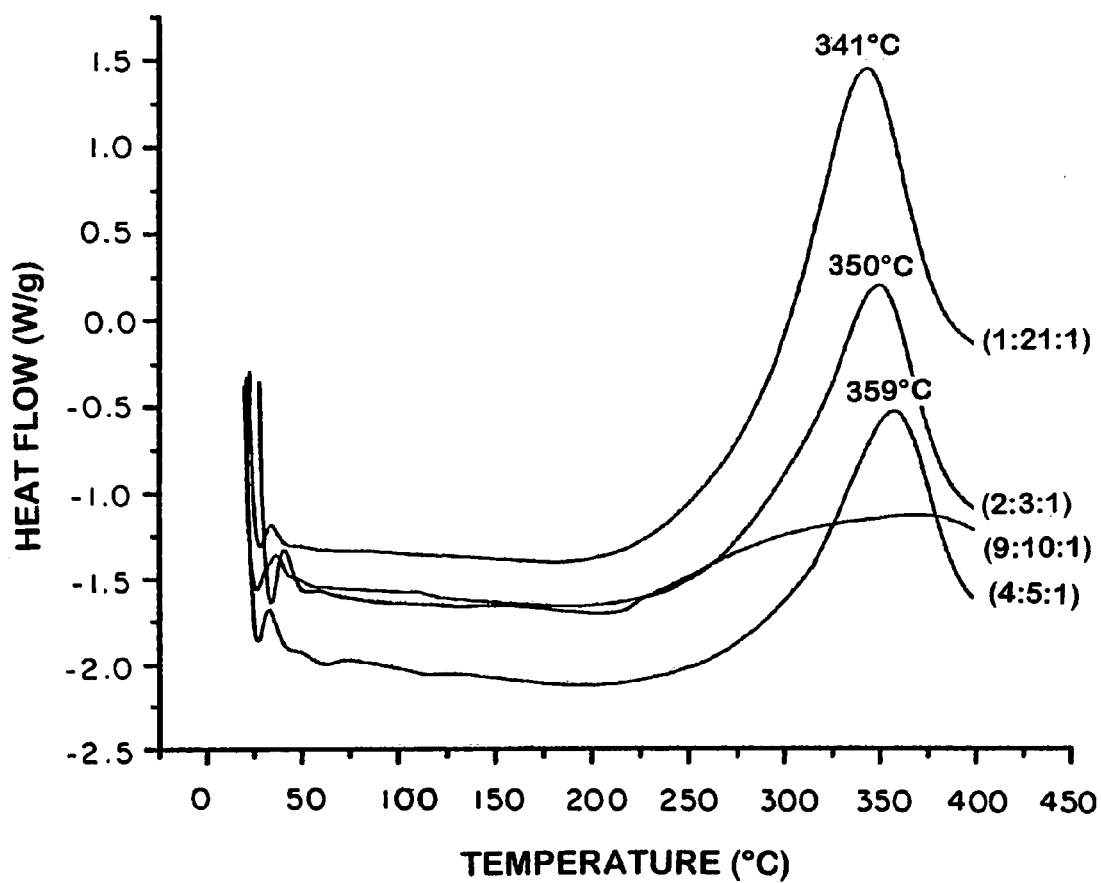
FIG. 1 shows DSC thermograms of disiloxane-containing linear polymers (2:3:1), (4:5:1), and (9:10:1) and a prior art polymer (1:2:1)

At a minimum the process comprises the steps of providing a siloxane-acetylene precursor and a siloxane-carborane precursor, and reacting them to form a linear polymer. The siloxane-acetylene precursor contains halogens, and the siloxane-carborane precursor contains Li, Na, K, or MgX', wherein X' is a halogen.

Siloxane-Acetylene Precursor

The siloxane-acetylene precursor can have the structure shown above in formula (3). Each R group is an independently selected organic group including, but not limited to, saturated aliphatic, unsaturated aliphatic, aromatic, and fluorocarbon groups. Using larger alkyl groups for the R groups may increase the solubility of the precursors in organic solvents and increase the hydrophobicity and decrease the thermo-oxidative stability of linear polymers and cured polymers made using the precursor. Using aryl groups for the R groups may increase the stiffness and slightly increase the thermo-oxidative stability of linear polymers made using the compound. The R groups can all be methyl groups. The X groups are not required to be the same halogen. Both X's can be chlorine. A suitable value for m is 2. A suitable average value for w is 1.

Siloxane-acetylene precursors can be synthesized in a two-step synthesis. This synthesis is an example of providing a siloxane-acetylene precursor. The claimed process is not limited by the following synthesis of a siloxane-acetylene precursor. The claimed compounds are not limited to siloxane-acetylene precursors or products thereof that are made by or may be made by this synthesis.

An acetylenic compound comprising the formula M—(C≡C)$_m$—M is obtained. M is selected from the group consisting of Li, Na, K, and MgX', wherein X' is a halogen. An example synthesis is to react four moles of n-butyl lithium with hexachloro-1,3-butadiene to form 1,4-dilithio-1,3-butadiyne as in formula (5).

$$Cl_2C=CCl-CCl=CCl_2 + 4 \; Li-C_4H_9 \rightarrow Li-C\equiv C-C\equiv C-Li \quad (5)$$

Similar reactions also produce acetylenic compounds with one or three ethynyl groups. Dilithioacetylene can be made by substituting trichloroethylene for hexachloro-1,3-butadiene in Formula (5). Disodium salt of 1,3,5-hexatriyne may be made according to the procedure disclosed in Bock et al., "d-Orbital Effects in Silicon Substituted π-Electron Systems. Part XII. Some Spectroscopic Properties of Alkyl and Silyl Acetylenes and Polyacetylenes," *J. Chem. Soc. (B)*, 1968, 10, 1158, incorporated herein by reference. Although there is no upper limit to the value of m, suitable ranges include, but are not limited to, 1 to 12, 1 to 10, 1 to 8, 1 to 6, 1 to 3, and 1 to 2.

Acetylenic derivatives having the general formula H—(C≡C)$_m$—H can be formed by the procedure disclosed in Eastmond et al., "Silylation as a Protective Method for Terminal Alkynes in Oxidative Couplings—A General Synthesis of the Parent Polyynes," *Tetrahedron*, 1972, 28, 4601, incorporated herein by reference, and can be converted into dilithio salts by reacting with n-butyllithium. Synthesis of the lower polyyne series H—(C≡C)$_m$—H (n=2, 3, 4 and 5) is known to be based upon low temperature sodamide dehydrohalogenation of α,ω-bis(chloromethyl)alkynes, ClCH$_2$—(C≡C)$_{m-1}$—CH$_2$Cl in liquid ammonia, a technique which provided a convenient route to diacetylene but which proved increasingly troublesome for tri- and tetraacetylene. Pentaacetylene, the highest member of the series was obtained in ca. 1% yield from the precursor, ClCH$_2$-(C≡C)$_4$—CH$_2$Cl. Polyynes in the series H—(C≡C)$_m$—H (n=4, 5, 6, 7, 8, 9, 10 and 12) are known to have been prepared in solution by sequences involving Cu-catalyses oxidative couplings (Hay technique) of silyl-protected terminal alkynes, partial cleavage (desilylation) of the products by alkali, recoupling and complete desilylation. Thus using conditions established in a model coupling Et$_3$Si—C≡C—H (I)→Et$_3$Si—(C≡C)$_2$—SiEt$_3$ (II), coupling of the silyldiyne Et$_3$Si—(C≡C)$_2$—H (III) gives Et$_3$S—(C≡C)$_4$—SiEt$_3$ (IV) which upon controlled cleavage yields a chromatographically separable mixture of Et$_3$S—(C≡C)$_4$—SiEt$_3$ (IV), Et$_3$Si—(C≡C)$_4$—H (V) and H—(C≡C)$_4$—H (VI). Coupling of Et$_3$Si—(C≡C)$_4$—H (V) in turn gives Et$_3$Si—(C≡C)$_8$—SiEt$_3$ (VII) which upon cleavage yields Et$_3$Si—(C≡C)$_8$—H (VIII) and H—(C≡C)$_8$—H (IX) and coupling of Et$_3$Si—(C≡C)$_8$—H (VIII) gives the bissilylhexadecaacetylene Et$_3$Si—(C≡C)$_{16}$—SiEt$_3$ (X).

Hexa-acetylene may be synthesized analogously:
Et$_3$Si—(C≡C)$_3$—SiEt$_3$ (XII)→Et$_3$Si—(C≡C)$_3$—H (XI)
Et$_3$Si—(C≡C)$_3$—H (XI)→Et$_3$Si—(C≡C)$_6$—SiEt$_3$ (XIII)
Et$_3$Si—(C≡C)$_6$—SiEt$_3$ (XIII)→Et$_3$Si—(C≡C)$_6$—H (XIV)
Et$_3$Si—(C≡C)$_6$—H (XIV)→H—(C≡C)$_6$—H (XV)

Dodeca-acetylene may be synthesized analogously:
Et$_3$Si—(C≡C)$_6$—H (XIV)→Et$_3$Si—(C≡C)$_{12}$—SiEt$_3$ (XVI)
Et$_3$Si—(C≡C)$_{12}$—SiEt$_3$ (XVI)→H—(C≡C)$_{12}$—H (XVII)

Other exemplary members of the series are prepared via mixed couplings:
(I)+(V)→Et$_3$Si—(C≡C)$_5$—SiEt$_3$ (XVI)→H—(C≡C)$_5$—H (XIX)
(I)+(XIV)→Et$_3$Si—(C≡C)$_7$—SiEt$_3$ (XX)→H—(C≡C)$_7$—H (XXI)
(I)+(VIII)→Et$_3$Si—(C≡C)$_9$—SiEt$_3$ (XXII)→H—(C≡C)$_9$—H (XXIII)
(III)+(VIII)→Et$_3$Si—(C≡C)$_{10}$—SiEt$_3$ (XXIV)→H—(C≡C)$_{10}$—H (XXV).

A dihalopolysiloxane may be made by reacting a dihalosilane with itself in the presence of water and diethylether to make a dihalodisiloxyl containing compound as shown in formula (6). Repeated reaction with the dihalosilane will add additional siloxyl groups and increase the value of x. Some dihalopolysiloxanes are also commercially available. Although there is no upper limit to the value of x or y, suitable ranges include, but are not limited to, at least 1, 1 to 1000, 1 to 500, 1 to 250, 1 to 10, 1 to 5, and 1 to 2.

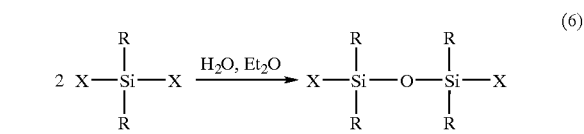

(6)

The butadiyne or other acetylenic compound may then be reacted with the dihalopolysiloxane (or dihalosilane when x is 0) to form the siloxane-acetylene precursor as shown in formula (7). The reaction may occur spontaneously at room temperature or below room temperature. When M is MgX', such as MgBr, the reaction is a Grignard reaction. An excess of the siloxyl compound is used so that the precursor is capped by the siloxyl moiety on both ends. The average value of w is determined by the ratio of dihalopolysiloxane to acetylenic compound. The closer the ratio is to 1, the larger the value of w. A 2:1 ratio or higher results in an average value of w of about 1. It is also possible to use combinations of different acetylenic compounds and polysiloxanes, such that in some molecules there are multiple values for m and x.

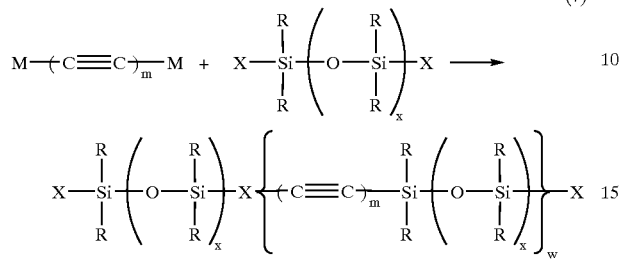
(7)

An example of this reaction is shown in formula (8), where m is 2, w is 1, x is 1, the halogen is chlorine, and all R groups are methyl groups. All compounds used are commercially available products. Other values and substituents are also possible. Compounds used in other embodiments may also be commercially available or may be synthesized according to known techniques.

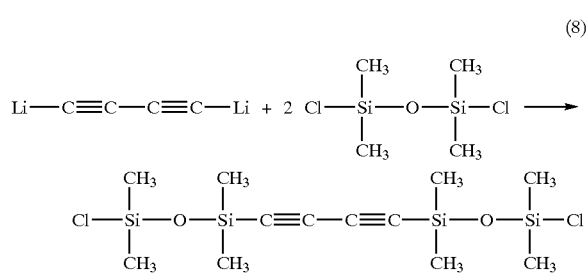
(8)

If only one dihalopolysiloxane compound is used, this process of making the siloxane-acetylene precursor produces a compound with at most 2(x+1) different R groups. Each polysiloxane unit in the precursor will have the same set of R groups in the same arrangement. However, if the polysiloxane unit is asymmetrical, it may be added in either of two mirror image orientations. This is exemplified in formula (9), where x is 1, and w is 2. When mixtures of different dihalopolysiloxanes are used, the result may be a mixture of siloxane-acetylene precursors, some of which may have all different R groups. This is shown in formula (10).

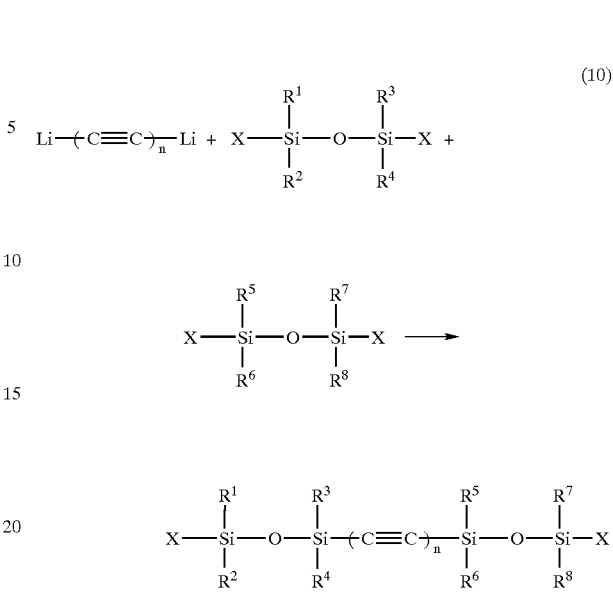
(10)

Siloxane-Carborane Precursor

The siloxane-carborane precursor, as shown in formula (4), can be made by reacting an excess amount of dilithiocarborane with a dihalopolysiloxane (or dihalosilane when y is 2). The claimed process is not limited by the following synthesis of a siloxane-carborane precursor. The claimed compounds are not limited to siloxane-carborane precursors or products thereof that are made by or may be made by this synthesis.

A dilithiocarborane may be made as shown in formula (11). Other carboranes may also be used in this reaction. The carborane may have substituents other then lithium. The general formula is M—$CB_qH_{q'}C$—M, where M is selected from the group consisting of Li, Na, K, and MgX', wherein X' is a halogen. The reaction to make the siloxane-carborane precursor is shown in formula (12). The siloxane compound may be made as described above, and suitable values for y are the same as for x. The reaction may occur spontaneously at room temperature or below room temperature. When M is MgX', such as MgBr, the reaction is a Grignard reaction. An excess of dilithiocarborane is used. It is also possible to use combinations of different carboranes and polysiloxanes, such that in some molecules there are multiple values for q, q', and y.

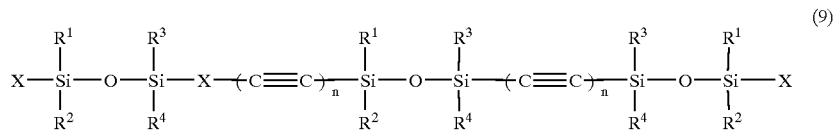
(9)

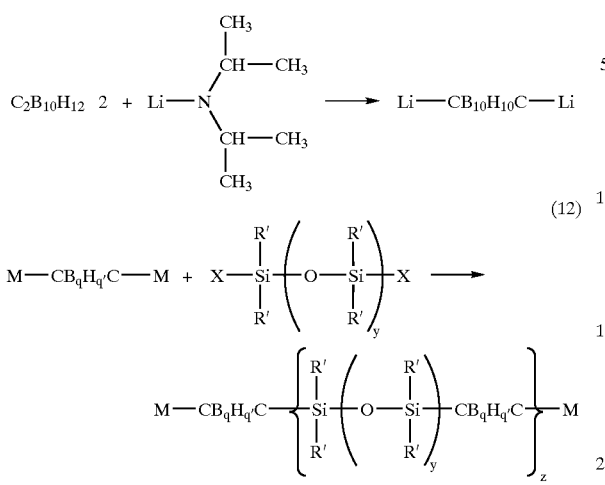

(11)

(12)

Each R' group is an independently selected organic group including, but not limited to, saturated aliphatic, unsaturated aliphatic, aromatic, and fluorocarbon groups. All R' groups can be methyl groups. The X groups are not required to be the same halogen. Both X's can be chlorine. It is to be understood that the formula $CB_qH_{q'}C$ includes carboranes in which one or more or all of the hydrogen atoms are replaced with other functional groups including, but not limited to, alkyl and halogen groups. An alternative structure encompassed by $CB_qH_{q'}C$ is $CB_qH_{q'}X_{q''}R_{(q-q'-q'')}C$. Suitable carborane groups include, but are not limited to, 1,7-dodecacarboranyl (1,7-$C_2B_{10}H_{10}$, m-carborane); 1,10-octacarboranyl (1,10-$C_2B_8H_8$); 1,6-octacarboranyl (1,6-$C_2B_8H_8$); 2,4-pentacarboranyl (2,4-$C_2B_5H_5$); 1,6-tetracarboranyl (1,6$C_2B_4H_4$); 9-alkyl-1,7-dodecacarboranyl (9-alkyl-1,7-$C_2B_{10}H_9$); 9,10-dialkyl-1,7dodecacarboranyl (9,10-dialkyl-1,7-$C_2B_{10}H_8$); 2-alkyl-1,10-octacarboranyl (2-alkyl-1,10-$C_2B_8H_7$); 8-alkyl-1,6-octacarboranyl (8-alkyl-1,6-$C_2B_8H_7$); decachloro-1,7-dodecacarboranyl (1,7-$C_2B_{10}Cl_{10}$); octachloro-1,10-octacarboranyl (1,10-$C_2B_8Cl_8$); decafluoro-1,7dodecacarboranyl (1,7-$C_2B_{10}F_{10}$); octafluoro-1,10-octacarboranyl (1,10-$C_2B_8F_8$); closo-dodecaorthocarboranyl; closo-dodeca-metacarboranyl; and closo-dodeca-paracarboranyl. The examples use 1,7-dodecacarboranyl (m-carborane), so that q and q' are both 10. m-Carborane and p-carborane may react faster than o-carborane.

The value of z depends on the stoichiometric ratio of dilithiocarborane to dihalopolysiloxane. A ratio of 2:1 will result in an average value of z of about 1, as in formula (13). A ratio of 3:2 will result in an average value of z of about 2 as in formula (14). All compounds used are commercially available products. Reactants used in other embodiments may also be commercially available or may be synthesized according to known techniques. Other values and substituents are also possible.

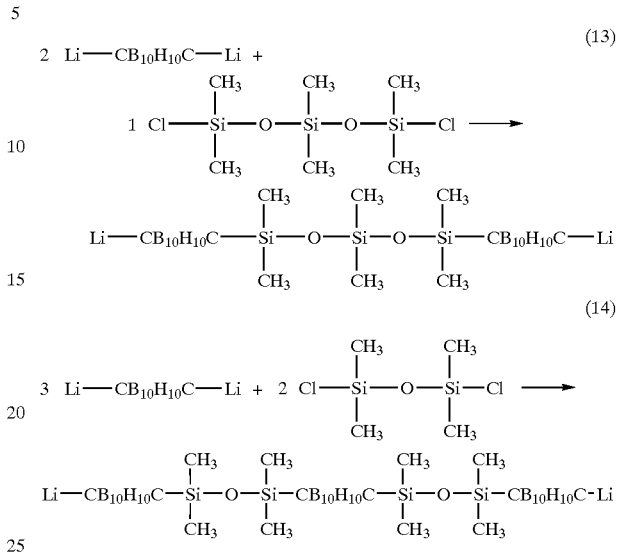

(13)

(14)

The smaller the ratio, the larger the value of z. This results in a linear polymer having more carborane units and more total siloxane units relative to the acetylene groups. If only one dihalopolysiloxane compound is used, this process of making the siloxane-acetylene precursor produces a compound with at most 2(y+1) different R' groups. Each polysiloxane unit in the precursor will have the same set of R' groups in the same arrangement. However, if the polysiloxane unit is asymmetrical, it may be added in either of two mirror image orientations, as described above for the siloxane-acetylene precursor. When mixtures of different dihalopolysiloxanes are used, the result may be a mixture of siloxane-carborane precursors, some of which may have all different R' groups.

Linear Polymer

The siloxane-acetylene precursor is reacted with the carborane-siloxane precursor to form a linear polymer as shown in formula (15). The reaction may occur spontaneously at room temperature or below room temperature. When M is MgX', such as MgBr, the reaction is a Grignard reaction. The claimed compounds are not limited to linear polymers that are made by or may be made by this process. A high molecular weight linear polymer may be formed by using a 1:1 or near 1:1 stoichiometric ratio of the two precursors. Formula (16) shows the general formula for the linear polymer when the initial reactants are m-carborane, 1,4-dilithio-1,3-butadiyne, and polysiloxanes fully substituted with methyl groups, and where w is 1

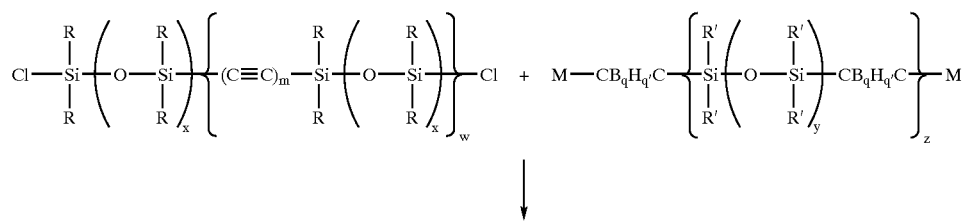

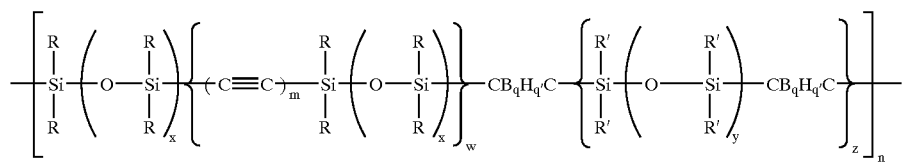

(15)

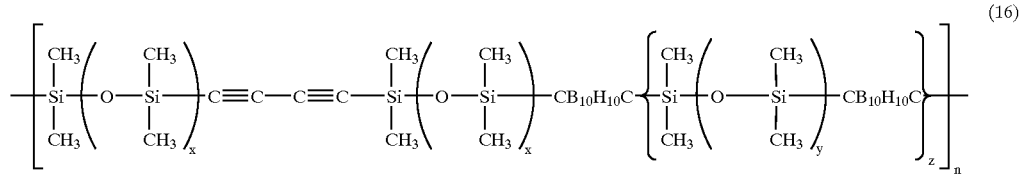

(16)

A given linear polymer may be partially described by the molar ratios of the three types of functional groups in the repeat unit. A (2:3:1) linear polymer has a repeat unit having 2 carborane units, 3 polysiloxane units, and 1 acetylenic unit. This corresponds to $z=1$. This nomenclature does not describe the values of m, x, y, q, q', or the R and R' groups. When z is 3, the ratio is (4:5:1), and when z is 8, the ratio is (9:10:1). As z increases, the fraction of acetylenic groups decreases. There is no upper limit on the value of z. However, a suitable range includes, but is not limited to, 1 to 10. There is no upper limit on the value of n. However, a suitable range of molecular weight includes, but is not limited to, about 10,000 to about 50,000.

Cured Polymer

The linear polymer may have only one acetylenic group, having one or more acetylenes, in the repeat unit. This can allow for the formation of an elastomer upon cross-linking, although some embodiments form a thermoset or plastic. Elastomers, plastics, and thermosets can also result from linear polymers having more than one acetylenic group. As used herein, the term "cured polymer" includes all such elastomers, plastics, and thermosets. The formula for the cured polymer is as shown above in formula (2).

The conversion of the linear polymer to the cured polymer can be accomplished by exposing the linear polymer to heat or light. Thermal conversion of the carbon-to-carbon triple bonds in the linear polymer to form the cured polymer is dependent on both the curing temperature and the curing time. The heating of the linear polymer can be carried out over a curing temperature range and time sufficient for the cross-linking of the carbon-to-carbon triple bonds of the individual linear polymers, resulting in the formation of a single mass of cured polymer. In general, the curing time may be inversely related to the curing temperature. Suitable temperature ranges include, but are not limited to, 150–450° C., 200–400° C., 225–375° C., and 250–350° C. Heating to temperatures of 600–700° C. may convert m-carborane groups in the cured polymer to p-carborane groups, as well as convert the material to a ceramic mass. Suitable curing time ranges include, but are not limited to, 1–48 hours, 2–24 hours, 8–12 hours, and 1–8 hours.

The photocross-linking process, of converting the carbon-to-carbon triple bonds of the linear polymer into unsaturated cross-linked moieties necessary for forming the cured polymer, is dependent on both the exposure time and the intensity of the light used during the photocross-linking process. Ultraviolet (UV) light is a suitable type of light to use during the photocross-linking process. The exposure time of the linear polymer to the UV light may be inversely related to the intensity of the UV light used. The exposure time, intensity, and wavelength of the UV or other light used is that sufficient for the carbon-to-carbon triple bonds of the linear polymer to be cross linked to form the cured polymer. Suitable exposure times include, but are not limited to, 1–100 hours, 24–36 hours, 12–24 hours, and 4–8 hours.

The linear polymers can exhibit sufficiently low viscosities either at room temperature or at higher temperatures below the polymerization temperature to readily fill complex dies or shapes for forming parts therefrom. The resulting cured polymers can retain the shape of the die or mold.

Formula (17) shows a portion of an example cured polymer. It is not required that every acetylenic carbon be cross-linked as shown. The structure shown is not intended to be representative of all possible cross-links. The cross-linked acetylenic moiety may include several different cross-linking structures such as those shown in formula (18).

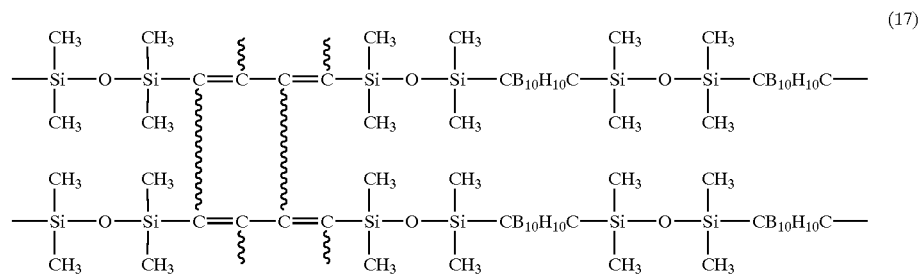

(17)

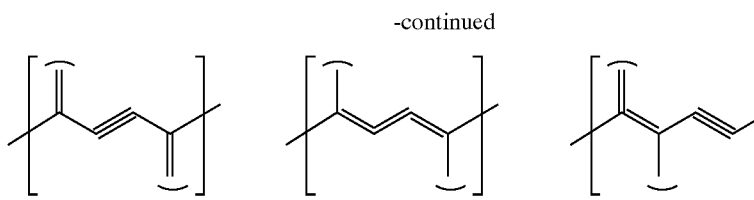

(18)

The acetylenic functionality may provide advantages relative to other cross-linking centers. An acetylenic moiety remains inactive during processing at lower temperatures and reacts thermally to form conjugated polymeric cross-links without the evolution of volatiles.

The properties of the cured polymers will depend on the distance separating the cross-linking centers. The concentration of the acetylenic units may dictate the extent of cross-linking and hence, the resultant freedom for the —Si—O—Si— backbone flexibility. In addition, an increase in the density of Si—O units and a reduction in the acetylenic units may also improve the elasticity of such systems. In poly(siloxane)s, a linear relationship can exist between the densities of Si—O units and the glass transition temperatures. The cured polymer may also be useful as a protective coating on fibers.

Disiloxane polymers may have greater thermal stability in comparison to the trisiloxane polymers, as such has been well established for corresponding poly(carborane-siloxane) systems (Peters, "Poly(dodecacarborane-siloxanes)," *J. Macromol. Sci.-Rev. Macromol. Chem. and Phys.*, 1979, C17(2), 173, incorporated herein by reference). This is demonstrated in the examples. Additionally, the thermal stability of the disiloxane polymers, relative to the trisiloxane systems, may be enhanced due to the slightly shorter distance between the cross-linking centers. This may be due to the greater concentration of acetylenes in their backbones, whereas in the trisiloxane systems, the distance between successive acetylene units is slightly longer.

The greater density of the —Si—O— groups in the trisiloxane systems may have the beneficial effect of conferring improved elasticity when compared to their disiloxane counterparts. In fact, this advantage is manifested in the glass transition temperatures of these systems. The glass transition temperatures of the disiloxane and the trisiloxane systems are found to be in the range of 56° C. to 35° C. and −35° C. to −47° C., respectively (Table 3). In both systems, the Tg values of the three constituent members of a series are found to decrease with a reduction in concentration of the acetylenic units. The (9:10:1) polymers in the trisiloxane and disiloxane systems, with the lowest acetylene concentration, were observed to exhibit the lowest Tg values of −47° C. and 35° C., respectively. Similarly, for the (2:3:1) polymers, the trisiloxane- and the disiloxane-cured cured polymers were found to show the highest Tg's with values of 35° C. and 56° C. Hence, at room temperature, the data indicates that the trisiloxane- and the disiloxane-cured systems exhibit elastomeric and plastic characteristics, respectively.

Ceramic

A ceramic may be made by heating or pyrolyzing the linear polymer or cured polymer. This may be done in a single step of heating the linear polymer, or the linear polymer may be converted to the cured polymer, followed by heating to form the ceramic. Suitable pyrolyzing conditions include, but are not limited to, 450–2750° C. in an inert atmosphere, such as $N_2$, and 450–1650° C. in an oxidizing atmosphere, such as air. The heating may be done at 1 atm pressure; however, the heating temperatures may be varied with the pressure. Thus, when the pressure is less than 1 atm, for example, under a vacuum, the heating range can be reduced sufficiently to drive off volatiles and to convert to the ceramic.

The linear polymer may be poured into a mold and heated between 150–450° C. to form the cured polymer either in conjunction with another filler material or reinforcing fibrous material, to add structural strength, or without such additive materials to form a solid or composite product. Upon pyrolyzing, the material can maintain the shape of the original mold. One advantage of making the ceramic is that it can be readily formed into various shapes due to the liquid state of the linear polymer at room temperature or at the melting point, and the ease of converting the linear polymer into the cured polymer by heating, and then into the ceramic by continued heating.

In an inert atmosphere, suitable pyrolyzing temperature ranges include, but are not limited to, 450–2750° C., 450–2000° C., 450–1500° C., and 450–1300° C. In an oxidizing atmosphere, suitable pyrolyzing temperature ranges include, but are not limited to, 450–1650° C., 450–1500° C., 450–1350° C., and 450–1100° C. Generally, the heating rate is that heating rate which is sufficient to drive off any volatile compounds and to form the desired ceramic. The heating rate is not a limiting factor of the present invention. However, suitable heating rate ranges include, but are not limited to, 0.01–200° C./min, 0.01–100° C./min, 0.01–50° C./min, and 0.01–25° C./min. Similarly, the cooling rate may be sufficient to cool the formed ceramic without causing significant thermal stresses or significant reduction in structural integrity of the formed ceramic. The cooling rate of the formed ceramic is not a limiting factor of the present invention. However, suitable cooling rate ranges include, but are not limited to, 0.01–200° C./min, 0.01–100° C./min, 0.01–50° C./min, and 0.01–25° C./min.

Having described the invention, the following examples are given to illustrate specific applications of the invention. These specific examples are not intended to limit the scope of the invention.

General conditions—Unless otherwise noted, all syntheses were performed under an atmosphere of dry argon utilizing standard Schlenk techniques. m-Carborane (m-CB; Olin) was sublimed prior to use. n-Butyl lithium (n-BuLi; Aldrich) was titrated before use. Lithium diisopropylamide (LDA; Aldrich) was used as received. Hexachlorobutadiene ($C_4Cl_6$), dichlorotetramethyldisiloxane (DCTMDS), and dichlorohexamethyltrisiloxane (DCHMTS) (all from Aldrich) were distilled before use. Anhydrous THF (99.9%; Aldrich) and diethyl ether ($Et_2O$; Aldrich) were used as received. The preparation of 1,4-dilithio-1,3-butadiyne was an adaptation from Ijadi-Magsooke et al., "Synthesis and study of silylene-diacetylene polymers," *Macromolecules* 1990, 23, 4485, incorporated herein by reference. Thermogravimetric analyses (TGA) were performed on a SDT 2960 Simultaneous DTA-TGA analyzer. The DSC studies were performed on a DSC 2920 Modulated DSC instrument. Unless otherwise mentioned, all thermal experiments were carried out with heating rates of 10° C./min (both TGA and DSC) and nitrogen flow rates of 100 cc/min. Infrared spectra were obtained on a Nicolet Magna 750 Fourier Transform infrared (FTIR) spectrophotometer. $^1$H and $^{13}$C NMR spectra were acquired on a Bruker AC-300 spectrometer and referenced to the internal solvent peak.

EXAMPLE 1

Synthesis of chlorodisiloxane-capped acetylene—A flame-dried 250 mL Schlenk flask, under argon, was charged with 10 mL of THF and was cooled to −78° C. by isopropanol/dry ice. n-BuLi (2.77 mL of 2.5 M solution in hexanes, 6.92 mmol, 4 eq.) was added slowly to the THF. After 10 min, $C_4Cl_6$ (0.27 mL, 1.73 mmol) was added drop wise over 10 min. The resultant gray-brown slurry was warmed to room temperature and stirred for 3 hours. After this period, the mixture was cooled again to −78° C. and DCTMDS (0.68 mL, 3.46 mmol) was added drop wise via a gas-tight syringe. The mixture was then warmed to room temperature and stirred for 2 hours, resulting in the formation of a large amount of white precipitate (LiCl).

EXAMPLE 2

Synthesis of lithiated m-carborane-capped disiloxane—In a 250 mL flame-dried flask, under argon, m-CB (0.5g, 3.47 mmol) was dissolved in 1 mL of THF and cooled to −78° C. LDA (3.5 mL, 7.01 mmol) was added dropwise to the solution resulting in the formation of a reddish orange solid. On warming the mixture to room temperature, the solid re-dissolved in THF. At this point, the volatiles were removed under vacuum. The residue was re-dissolved in 2 mL of THF and the mixture was cooled to 0° C. To this solution, DCTMDS (0.34 mL, 1.73 mmol) was added dropwise via a gas-tight syringe. The mixture was stirred for 3 hours.

EXAMPLE 3

Synthesis of (2:3:1) poly(carborane-disiloxane-acetylene) linear polymer—The solution resulting from Example 1 was cannulated into the flask containing the result of Example 2. The mixture was stirred further for 2 hours. At this time, a few drops of DCTMDS were added to the mixture and the stirring was continued for an additional hour. Once the stirring was completed, the mixture was poured into 50 mL of cold saturated $NH_4Cl$ and was extracted three times with 75 mL each of $Et_2O$. The $Et_2O$ extracts were combined, washed with 100 mL brine, and dried over anhydrous $Na_2SO_4$. The dried extracts were filtered through a one-inch pad of Celite and the solvents were removed under vacuum. A dark brown viscous oil was obtained.

EXAMPLE 4

Synthesis of other poly(carborane-disiloxane-acetylene) linear polymers—Other linear polymers were synthesized using similar procedures. Table 1 shows the amounts in mmol of the reagents used. Ratios of (2:3:1), (4:5:1), and (9:10:1) were made using both a disiloxane and a trisiloxane. All of the syntheses of Examples 3 and 4 proceeded to high yields (85–95%) of the linear polymers, which were viscous brown oils. The disiloxane products appeared more viscous than the trisiloxane systems, presumably because of the lesser flexibility of the —Si—O—Si— backbone relative to the —Si—O—Si—O—Si— backbone.

TABLE 1

| | siloxane-acetylene precursor | | | siloxane-carborane precursor | | |
|---|---|---|---|---|---|---|
| | $C_4Cl_6$ | n-BuLi | DCTMDS or DCHMTS | m-CB | LDA | DCTMDS or DCHMTS |
| (2:3:1) | 1.73 | 6.92 | 3.46 | 3.47 | 7.01 | 1.74 |
| (4:5:1) | 0.86 | 3.44 | 1.73 | 4.36 | 8.81 | 3.47 |
| (9:10:1) | 0.38 | 1.52 | 0.76 | 4.82 | 9.74 | 4.50 |

The progress of the reactions with DCTMDS was monitored by FTIR and NMR characterization studies. The appearance and growth of the diacetylene moiety at 2075 cm$^{-1}$ and the complete disappearance of the butadiene band in the FTIR spectrum indicated that the reaction had proceeded to completion. Other prominent absorptions exhibited by the products include the peaks at 2963 (C—H), 2600 (B—H), 1081 (strong Si—O—Si stretching), and at 1260, 840, and 810 (strong Si—C deformation) cm$^{-1}$. The intensity of the diacetylenic stretch at 2070 cm$^{-1}$ decreased as z became larger. The diacetylenic and siloxyl methyl carbons were also identified by the resonances at 88–85 and 2–0 ppm, respectively, in the $^{13}$C NMR spectra. The $^1$H NMR spectra for the linear polymers showed siloxyl methyl and B-H resonances between 0.4–0.0 and 3.5–1.0 ppm, respectively. Table 2 exhibits the FTIR and NMR ($^1$H and $^{13}$C) absorptions of the three polymers.

TABLE 2

| Polymer | IR (cm$^{-1}$)$^a$ | $^1$H NMR$^b$ | $^{13}$C NMR$^c$ |
|---|---|---|---|
| (2:3:1) disiloxane | 2072(s) (C≡C—C≡C) | | 1.79, 1.00, 0.52, 0.26 |
| | 2972(s) (C—H) | 0.27(s), 021(s), 0.18(s), 0.12(s), | (Si—(CH$_3$)$_2$) |
| | 2606(vs, br) (B—H) | 0.08(s), (0.05)(s) (Si—(CH$_3$)$_2$) | |
| | 1074(vs, br) (Si—O—Si) | | 65.92 (CB$_{10}$H$_{10}$C) |
| | 1267(vs), 841(s), | 3.25–0.72(br) (CB$_{10}$H$_{10}$C) | |
| | 804(vs, br) (Si—C) | | 86.8, 84.2 (C≡C—C≡C) |
| (4:5:1) disiloxane | 2073(s) (C≡C—C≡C) | | 1.80, 1.02, 0.53, 0.29 |
| | 2969(s) (C—H) | 0.28(s), 022(s), 0.17(s), 0.12(s), | (Si—(CH$_3$)$_2$) |
| | 2602(vs, br) (B—H) | 0.09(s), (0.05)(s) (Si—(CH$_3$)$_2$) | |
| | 1071 (vs, br) (Si—O—Si) | | 65.90 (CB$_{10}$H$_{10}$C) |
| | 1268(vs), 842(s), | 3.25–0.72(br) (CB$_{10}$H$_{10}$C) | |
| | 805(vs, br) (Si—C) | | 87.0, 84.6 (C≡C—C≡C) |
| (9:10:1) disiloxane | 2075(s) (C≡C—C≡C) | | 1.80, 1.00, 0.47, 0.29 |
| | 2969(s) (C—H) | 0.26(s), 021(s), 0.16(s), 0.11(s), | (Si—(CH$_3$)$_2$) |
| | 2602(vs, br) (B—H) | 0.07(s), (0.04)(s) (Si—(CH$_3$)$_2$) | |
| | 1070(vs, br) (Si—O—Si) | | 65.86 (CB$_{10}$H$_{10}$C) |
| | 1264(vs), 839(s), | 3.25–0.72(br) (CB$_{10}$H$_{10}$C) | |
| | 801(vs, br) (Si—C) | | 87.4, 84.8 (C≡C—C≡C) |

$^a$Relative intensities: vs—very strong, s—strong, m—medium, w—weak, br—broad.
$^b$In parts per million relative to CDCl$_3$ peak. Multiplicities: s—singlet, br—broad.
$^c$In parts per million relative to central CDCl$_3$ peak.

EXAMPLE 5

Figure 2:
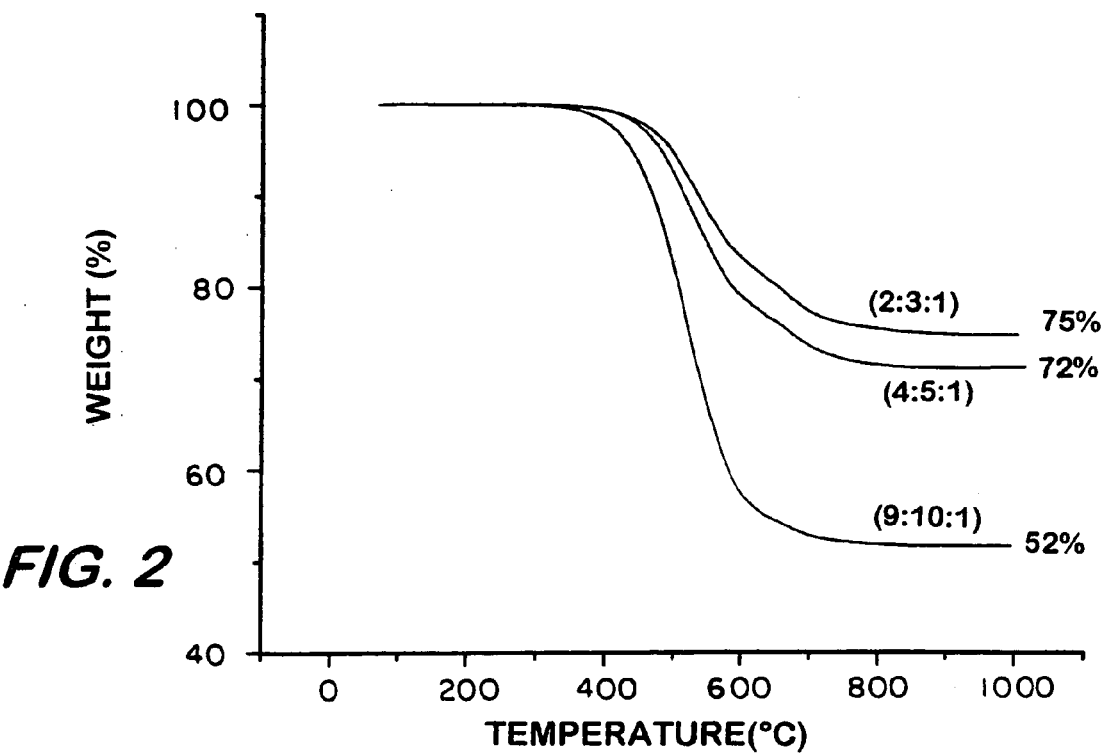
FIG. 2 shows TGA thermograms of disiloxane-containing linear polymers (2:3:1), (4:5:1), and (9:10:1) in a flow of nitrogen.

Formation and thermal properties of cured polymers—DSC runs of both sets of polymers (disiloxyls and trisiloxyls) indicated that the cross-linking of the acetylenes to form network systems occurred between 275–350° C. Based on this data, all the samples were cured at 250° C. for 30 min and further at 350° C. for 60 min under $N_2$ to facilitate their complete conversion into cross-linked network systems. The cured samples were then heated under $N_2$ to 1000° C. to test their thermal stabilities (FIG. 2). Between the sets, the disiloxane oligomers were found to be more stable than the trisiloxane oligomers on heating to 1000° C. (See Table 3). Additionally, in a set, the linear polymer that had the greatest concentration of acetylenic groups exhibited the greatest retention of weight. Similarly, the thermal stabilities of the other two cured systems, within a set, decreased proportionally with the degree of acetylene concentration.

TABLE 3

|  | disiloxyl char yield/Tg | trisiloxy char yield/Tg |
| --- | --- | --- |
| (2:3:1) | 75%/56° C. | 68%/–35° C. |
| (4:5:1) | 72%/45° C. | 63%/–43° C. |
| (9:10:1) | 52%/35° C. | 41%/–47° C. |

EXAMPLE 6

Thermal Properties—The thermal properties of the three polymers made from DCTMDS were studied by DSC analysis. The DSC thermograms indicated that the cross-linking of the diacetylene units to form a network system occurred between 275–380° C. The DSC plots for the polymers are shown in FIG. 1 as well as (1:2:1) poly(m-carborane-disiloxane-diacetylene), shown in Formula (19), for comparison. The DSC exotherms for (2:3:1) and (4:5:1) peaked at 350° C. and 359° C., respectively. The exotherm maximum of (9:10:1) was not as pronounced and did not show a clear maximum as observed for (2:3:1) and (4:5:1), presumably due to the lower concentration of diacetylene units in this system. However, the onset of curing for (9:10:1) occurred at about the same temperature as in (2:3:1) and (4:5:1). These values were greater than the exotherm maximum value of 341° C. of (1:2:1). The lower concentration of diacetylene units in the (2:3:1), (4:5:1), and (9:10:1) systems may have required a higher curing temperature than (1:2:1) to facilitate the 1,4-addition reaction of the diacetylenes. The propensity for the 1,4-addition reaction in these diacetylene-diluted systems also may have suffered due to the greater concentration of carboranes when compared to (1:2:1). The carborane unit, being electron withdrawing, makes the 1,4-addition reactions thermodynamically less favorable. This trend was also borne out in the much lower Tg value (289° C.) for the acetylene-rich (1:2:1). The (1:2:1), with the highest concentration of diacetylene units, has the most intense exotherm, and (9:10:1), with the lowest diacetylene concentration, has a greatly reduced exotherm.

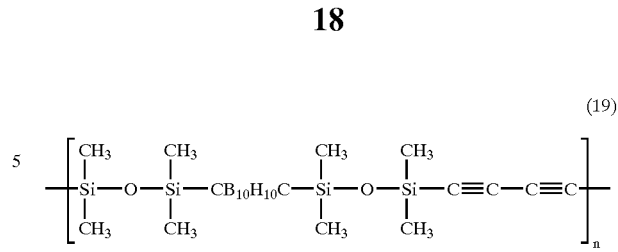

(19)

EXAMPLE 7

Thermal properties of chars—The thermo-oxidative stabilities of the charred materials were also studied. Samples of the three cured polymers made using DCTMDS that had been heated to 1000° C. in $N_2$ were thermally treated in air to 1000° C. After their oxidative exposure, the chars of (2:3:1), (4:5:1), and (9:10:1) gained 0.8%, 2.8% and 6.2% in weight, respectively. The major extent of weight increase occurred between 800° C. and 1000° C. Samples of the corresponding linear polymers were also heated directly in air. In the case of (9:10:1), there was a dramatic weight increase (about 5%) above 650° C., which was absent for (2:3:1) and (4:5:1). The enhanced oxidation for (9:10:1) may be due to a lower cross-linked density resulting in a larger amount of free volume, which allowed oxygen to penetrate more easily into the char. Such a feature would expose the borosilicates, formed during the heat treatment, to oxidation relative to the other two more densely cross-linked systems. This may also explain the greater gain (6.2%) of the char from (9:10:1) on exposure to oxygen as compared to (2:3:1) (0.8%) and (4:5:1) (2.8%).

EXAMPLE 8

Figure 3:
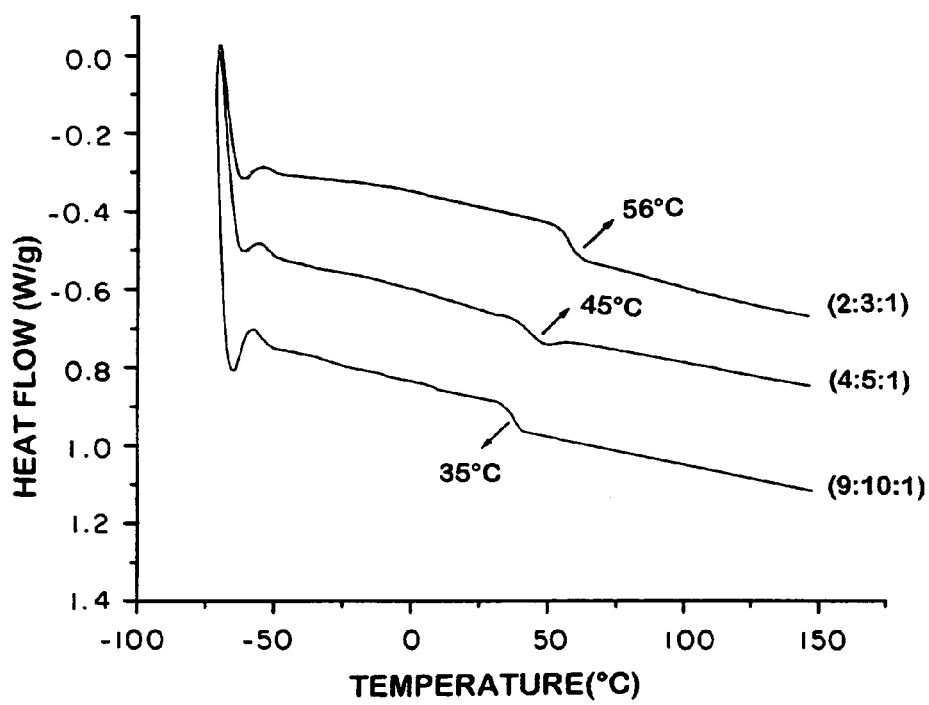
FIG. 3 shows DSC thermograms of showing the glass transition temperatures of disiloxane-containing cured polymers (2:3:1), (4:5:1), and (9:10:1)

Glass transition studies—DSC analysis was used to determine the Tg of the cured polymers made using DCTMDS. The linear polymers were initially heated under $N_2$ at 250° C. for 30 min and further at 400° C. for two hours. The resulting cured polymers were then cooled to –70° C. and heated at 10° C./min to 150° C. The Tg values of the three systems were found to decrease proportionally with a reduction in concentration of the crosslinked centers. Cured polymers (2:3:1), (4:5:1), and (9:10:1) exhibited Tg values (FIG. 3 and Table 3) of 56, 45, and 36° C., respectively. For comparison, the Tg values of linear poly(disiloxane-carborane) and the cured poly(disiloxane-diacetylene) are 25 and 144° C., respectively. Hence, it appears that the incorporation of the diacetylene units into the poly(disiloxane-carborane)s came at the expense of their elasticity. The observed Tg values indicate that the cured polymers have plastic characteristics at room temperature.

Figure 4:
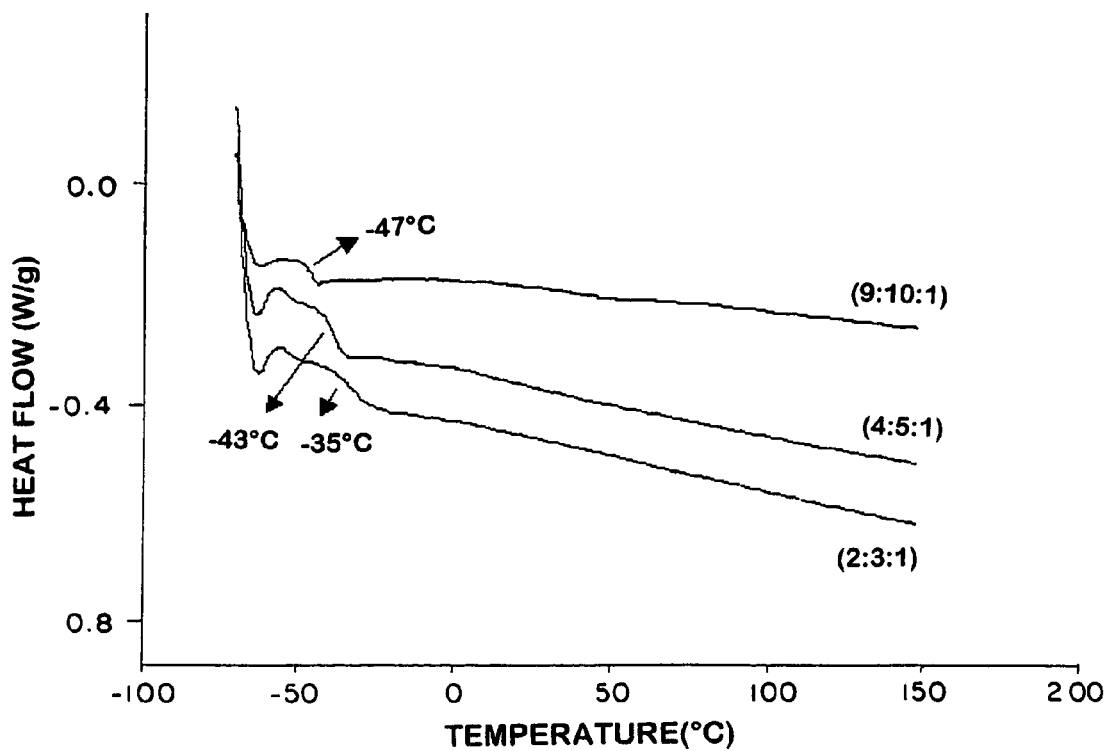
FIG. 4 shows DSC thermograms showing the glass transition temperatures of trisiloxane-containing cured polymers (2:3:1), (4:5:1), and (9:10:1).

The Tg of the cured polymers made using DCHMTS was also determined. Poly(trisiloxane-carborane) and poly(disiloxane-carborane) have Tg values of –50° C. and 25° C., respectively. Hence, a longer spacer resulting in an increase in the siloxyl concentration in the poly(m-carborane-siloxane-diacetylene) systems could produce a similar reduction in the Tg values. The Tg results are shown in FIG. 4 and Table 3. The trisiloxane cured polymers have lower Tg's and are cured polymers at room temperature.

EXAMPLE 9

Coating of Zylon fiber with cured polymers to protect against oxidation—A coating solution was prepared by dissolving 0.5 g of trisiloxyl linear polymer (4:5:1) in 5 mL of $CH_2Cl_2$. A tow of Zylon fibers (an organic polymeric fiber) was cut into small pieces (~0.5 inch, ~10 mg in weight) and initially dried at about 400° C. for 4 hr in $N_2$ in a TGA apparatus to ensure the expulsion of moisture. The Zylon tows were subsequently stored in a desiccator for later usage. After drying and weighing, a tow was immersed in a vial containing a portion of the prepared solution for 5 minutes. At this time, the excess solution was drained off and the vial with the coated tow was placed over a hot air blow dryer for 40 sec to drive away any residual $CH_2Cl_2$ and was then weighed to obtain the weight of the coating. The coated fiber was then cured at 250° C. for 30 min and at 400° C. for 2 hr in $N_2$. It was weighed again to see whether any weight was lost during the curing of the coated Zylon tow. The weight loss during curing was found to be negligible. This procedure was repeated three times, which was found to protect the Zylon against oxidation upon subsequent heating to 1000° C. in air. Using this concentration, three coatings and curing to 400° C. were necessary for complete protection. The number of coating layers for total protection would depend on the concentration of the coating solution.

Obviously, many modifications and variations of the present invention are possible in light of the above teachings. It is therefore to be understood that the claimed invention may be practiced otherwise than as specifically described.

I claim:

1. A linear polymer comprising the formula:

$$\left[\left[\begin{array}{c}R\\|\\Si\\|\\R\end{array}-\left(O-\begin{array}{c}R\\|\\Si\\|\\R\end{array}\right)_x\right]\left[(C\equiv C)_m-\begin{array}{c}R\\|\\Si\\|\\R\end{array}\left(O-\begin{array}{c}R\\|\\Si\\|\\R\end{array}\right)_x\right]_w-CB_qH_{q'}C-\right.$$
$$\left.-\left\{\begin{array}{c}R'\\|\\Si\\|\\R'\end{array}\left(O-\begin{array}{c}R'\\|\\Si\\|\\R'\end{array}\right)_y-CB_qH_{q'}C\right\}_z\right]_n$$

wherein m, n, w, and z are independently selected integers greater than or equal to 1;
wherein x and y are independently selected integers greater than or equal to 0;
wherein q is an integer from 3 to 16;
wherein q' is an integer from 0 to 16;
wherein each R group is an independently selected organic group;
wherein each R' group is an independently selected organic group;
wherein $(C\equiv C)_m$ represents an alkynylene group when m is 1 or conjugated alkynylene groups when m is greater than 1; and
wherein $CB_qH_{q'}C$ is a carborane group.

2. The linear polymer of claim 1, wherein every R group and every R' group is methyl.

3. The linear polymer of claim 1, wherein m is 2.

4. The linear polymer of claim 1, wherein x and y are independently selected integers greater than or equal to 1.

5. The linear polymer of claim 1, wherein x and y are independently selected from the group consisting of 1 and 2.

6. The linear polymer of claim 1, wherein the average value of w is about 1.

7. The linear polymer of claim 1, wherein the average value of z is from 1 to 10.

8. The linear polymer of claim 1, wherein q and q' are 10.

9. The linear polymer of claim 1, wherein $CB_qH_{q'}C$ is m-carborane.

10. A synthesis process comprising the steps of:
providing a siloxane-acetylene precursor comprising the formula:

$$X-\begin{array}{c}R\\|\\Si\\|\\R\end{array}\left(O-\begin{array}{c}R\\|\\Si\\|\\R\end{array}\right)_x\left[(C\equiv C)_m-\begin{array}{c}R\\|\\Si\\|\\R\end{array}\left(O-\begin{array}{c}R\\|\\Si\\|\\R\end{array}\right)_x\right]_w-X$$

and a carborane-siloxane precursor comprising the formula:

$$M-CB_qH_{q'}C-\left\{\begin{array}{c}R'\\|\\Si\\|\\R'\end{array}\left(O-\begin{array}{c}R'\\|\\Si\\|\\R'\end{array}\right)_y-CB_qH_{q'}C\right\}_z-M$$

wherein m, w, and z are independently selected integers greater than or equal to 1;
wherein x and y are independently selected integers greater than or equal to 0;
wherein q is an integer from 3 to 16;
wherein q' is an integer from 0 to 16;
wherein M is selected from the group consisting of Li, Na, K, and MgX', wherein X' is a halogen;
wherein each R group is an independently selected organic group;
wherein each R' group is an independently selected organic group;
wherein X is a halogen;
wherein $(C\equiv C)_m$ represents an alkynylene group when m is 1 or conjugated alkynylene groups when m is greater than 1; and
wherein $CB_qH_{q'}C$ is a carborane group; and
reacting the siloxane-acetylene precursor with the carborane-siloxane precursor to form a linear polymer.

11. The process of claim 10, wherein x and y are independently selected integers greater than or equal to 1.

12. The process of claim 10,
wherein every R group and every R' group is methyl;
wherein m is 2;
wherein the average value of w is about 1;
wherein x and y are independently selected from the group consisting of 1 and 2;
wherein the average value of z is from 1 to 10; and
wherein q and q' are 10.

13. The process of claim 10, further comprising the step of:
heating the linear polymer to form a ceramic.

* * * * *